(12) United States Patent
Hanagan et al.

(10) Patent No.: US 11,685,699 B2
(45) Date of Patent: Jun. 27, 2023

(54) COATING METHODS AND MATERIALS TO REDUCE AGING OF SIC HOT SURFACE IGNITORS

(71) Applicant: Coorstek, Inc., Golden, CO (US)

(72) Inventors: Michael J. Hanagan, Grafton, MA (US); Al Marshall, Merrimack, NH (US)

(73) Assignee: CoorsTek, Inc., Golden, CO (US)

( * ) Notice: Subject to any disclaimer, the term of this patent is extended or adjusted under 35 U.S.C. 154(b) by 430 days.

(21) Appl. No.: 16/928,554

(22) Filed: Jul. 14, 2020

(65) Prior Publication Data

US 2021/0017091 A1 Jan. 21, 2021

Related U.S. Application Data

(60) Provisional application No. 62/874,338, filed on Jul. 15, 2019.

(51) Int. Cl.
| | | |
|---|---|---|
| C04B 41/50 | (2006.01) | |
| C04B 41/52 | (2006.01) | |
| F23Q 7/22 | (2006.01) | |
| C04B 35/565 | (2006.01) | |
| C04B 41/00 | (2006.01) | |
| C04B 41/87 | (2006.01) | |

(52) U.S. Cl.
CPC ........ *C04B 41/5035* (2013.01); *C04B 35/565* (2013.01); *C04B 41/009* (2013.01); *C04B 41/524* (2013.01); *C04B 41/87* (2013.01); *F23Q 7/22* (2013.01)

(58) Field of Classification Search
None
See application file for complete search history.

(56) References Cited

U.S. PATENT DOCUMENTS

| | | | |
|---|---|---|---|
| 3,492,153 | A | 1/1970 | Ervin, Jr. |
| 3,875,477 | A | 4/1975 | Fredriksson et al. |
| 4,187,344 | A | 2/1980 | Fredriksson |
| 4,429,003 | A | 1/1984 | Fredriksson et al. |
| 6,297,183 | B1 | 10/2001 | Willkens et al. |
| 2011/0028301 | A1 | 2/2011 | Vargas-Gonzalez et al. |

OTHER PUBLICATIONS

"Product Information Sheet No. PD-21: Prehydrolyzed Ethyl Silicate R25," Remet Corporation, Aug. 20, 2015, 2 pages.
"Product Information Sheet No. PD-10: REMASOL Colloidal Silica," Remet Corporation, Aug. 20, 2015, 2 pages.

*Primary Examiner* — Colin W. Slifka
(74) *Attorney, Agent, or Firm* — Greenberg Traurig, LLP (57) ABSTRACT

An ignitor that includes at least one layer of silicon dioxide coating a silicon carbide material, methods of making and using the ignitor, and a kit that includes the ignitor are provided. The silicon dioxide coating is not intended to be removed prior to use. Rather, it is intended to remain on the ignitor during use.

20 Claims, 4 Drawing Sheets

COATING METHODS AND MATERIALS TO REDUCE AGING OF SIC HOT SURFACE IGNITORS

CROSS REFERENCE TO RELATED APPLICATIONS

This application claims the benefit of priority under 35 U.S.C. § 119(e) to U.S. Provisional Patent Application 62/874,338 filed Jul. 15, 2019. The entirety of this application is incorporated herein by reference.

FIELD OF THE INVENTION

The present invention relates to a method to apply a silicon dioxide coating to the surface of a silicon carbide ignitor, and to a silicon carbide ignitor coated with silicon dioxide.

BACKGROUND

Silicon carbide (SiC) ignitors are known to fail due to aging. During use, the SiC ignitor is exposed to an oxidizing atmosphere (i.e., air and/or water vapor) at elevated temperatures (above about 1000° C.). The oxidizing atmosphere penetrates the pores of the SiC material and reacts at the surface of the pores to form a silica (i.e., silicon dioxide or $SiO_2$) layer that builds up over time, increasing the resistance of the ignitor. When the ignitor is used in conjunction with an inline gas valve, this increased resistance causes a decrease in electrical current (at a constant voltage). Eventually, the resistance increase causes the current to drop below the minimum current requirement to operate the valve, at which point the burner will fail to ignite resulting in the need to replace the SiC ignitor.

Several attempts to make SiC ignitors more resistant to oxidation through the application of protective coatings are known in the art. For example, U.S. Pat. No. 3,492,153, which is incorporated by reference in its entirety, describes SiC heating elements that are coated with aluminum nitride that is formed by reacting aluminum vapor with nitrogen gas within the pores of the SiC. U.S. Pat. No. 4,187,344, which is incorporated by reference in its entirety, discloses SiC heating elements coated with silicon nitride and/or silicon oxynitride particles. The porous elements are coated with silicon nitride and/or silicon oxynitride particles in a liquid slurry, dried, and then fired to fix the silicon nitride or silicon oxynitride particles in place. U.S. Pat. No. 6,297,183, which is incorporated by reference in its entirety, discloses SiC heating elements that are coated with an additional or second layer of crystalized SiC. The pores of the conventional SiC body are infiltrated with fine particles of SiC and the element is refired to crystalize the additional SiC layer within the pores, effectively reducing the surface area of the SiC material. While these coatings may provide some protection against oxidation of the SiC material, they still do not display an acceptable life in gas oven environments.

One solution, disclosed in U.S. Pat. No. 4,429,003, which is incorporated by reference in its entirety, is a method to produce a protective silicon dioxide layer over a SiC material. The method comprises coating the porous SiC ignitor with a slurry of fine SiC particles that penetrate and deposit within the pores of the SiC body. The coated ignitor body is then subjected to an oxidizing atmosphere to convert at least some of the SiC particles to silicon dioxide. However, it was found that the resulting silicon dioxide layer tended to devitrify and undergo a phase change in use, and so was prone to flaking.

Based on the foregoing, there is a need in the art for SiC ignitors that are more resistant to aging.

SUMMARY

This invention provides a thin layer or layers (between about 0.1 μm and about 5 μm thickness) of silica or silicon dioxide ($SiO_2$) to coat the SiC ignitor. The $SiO_2$ layer(s) impedes the diffusion of oxygen to the underlying SiC, thus slowing the oxidation rate of the SiC, allowing the ignitor to function properly for a longer period of time. The thicker the $SiO_2$ layer, the longer it takes for the oxygen to diffuse to the underlying SiC. This applied layer of $SiO_2$ has the effect of immediately slowing the initial rate of oxidation compared to an uncoated SiC surface. An untreated SiC material will oxidize at a faster rate until the resulting $SiO_2$ layer becomes as thick as the treated surface. During this initial oxidation period the resistance of the untreated ignitor will decrease at a faster rate compared to a coated ignitor.

A benefit of the of the present invention is that the $SiO_2$ layer is added to the SiC surface of the ignitor and not formed by the conversion of the SiC to $SiO_2$. By leaving the underlying SiC material of the ignitor unaffected there is no alteration of its electrical properties. This enables the electrical properties of the SiC ignitor to be defined during manufacturing using standard processes and maintained for a longer period of time during operation. In contrast, $SiO_2$ layers that form when the SiC material of the ignitor is exposed to oxygen at elevated temperatures, not only result in a reduced thickness of the SiC material, but also alters the chemical and electrical properties of the SiC material of the ignitor. In these instances, the source of the silicon in the $SiO_2$ layer is from the silicon in the SiC material of the ignitor. Thus, the $SiO_2$ layer, formed by exposing the SiC material to oxygen, is formed at the detriment of the SiC material. The $SiO_2$ coating of the present invention also provides benefits over the $SiO_2$ coating that is formed by oxidizing fine SiC particulates that are introduced into the pores of the crystalline SiC material during the manufacture of the ignitor. When the SiC particles are oxidized, the resulting coating is not a continuous, uniform coating of $SiO_2$. Rather, portions the SiC material of the ignitor remain exposed and/or vulnerable to oxidation.

The present invention does not require the silicon from the SiC to form the $SiO_2$ layer. Instead the $SiO_2$ layer is added over at least a portion of the SiC material. Thus, in some embodiments, the thickness of the SiC layer is not reduced due to the addition of the $SiO_2$ layer. Furthermore, in some embodiments, the SiC layer is not chemically changed due to the addition of the $SiO_2$ layer. Advantageously, the $SiO_2$ layer of the present invention is more continuous in its coverage over the SiC material, thereby providing the SiC material more protection from oxidation. Further, fewer fines of SiC are required or left on the surface of the SiC material, thereby reducing the active SiC surface area. Finally, embodiments of the present invention of an ignitor which include the $SiO_2$ layer on the SiC material can provide, prior to operation, electrical properties (e.g., resistance at room temperature or operational temperatures) that are within 20% of the electrical properties of ignitors that do not include a $SiO_2$ layer on the SiC material (e.g., a SiC ignitor or a SiC ignitor with $SiO_2$ grown via oxidation of the SiC material).

An aspect of the invention is a method to apply a silicon dioxide coating to a SiC ignitor, comprising:

coating at least a portion of a SiC material of the SiC ignitor with a silicon dioxide material to produce a SiC ignitor coated with a first layer of the silicon dioxide material; and drying the first layer of the silicon dioxide material to form a silicon dioxide layer.

An aspect of the invention is an ignitor comprising:

a silicon dioxide coating adhered to at least a portion of a SiC material of a SiC ignitor, wherein a thickness of the silicon dioxide coating is between about 0.1 µm and about 5 µm and wherein the silicon dioxide covers between about 25% and about 100% of a surface area of the SiC material of the SiC ignitor.

An aspect of the invention is a kit comprising:

a SiC ignitor comprising:

a SiC material; and at least one layer of a silicon dioxide material, wherein a thickness of the silicon dioxide material is between about 0.1 µm and about 5 µm and wherein the silicon dioxide covers between about 25% and about 100% of a surface area of the SiC material of the SiC ignitor.

An aspect of the invention is a method of using an ignitor, comprising:

providing a SiC ignitor comprising:

a SiC material; and at least one layer of a silicon dioxide material, wherein a thickness of the silicon dioxide material is between about 0.1 µm and about 5 µm and wherein the silicon dioxide material covers between about 25% and about 100% of a surface area of the SiC material of the SiC ignitor; and applying a voltage sufficient to maintain a temperature of at least 1000° C. on a surface of the SiC ignitor.

As used herein, "at least one," "one or more," and "and/or" are open-ended expressions that are both conjunctive and disjunctive in operation. For example, each of the expressions "at least one of A, B, and C," and "A, B, and/or C" means A alone; B alone; C alone; A and B together; A and C together; B and C together; or A, B, and C together.

Various embodiments of the present inventions are set forth in the attached figures and in the Detailed Description as provided herein and as embodied by the claims. It should be understood, however, that this Summary does not contain all of the aspects and embodiments of the one or more present inventions, is not meant to be limiting or restrictive in any manner, and that the invention(s) as disclosed herein is/are understood by those of ordinary skill in the art to encompass obvious improvements and modifications thereto.

Additional advantages of the present invention will become readily apparent from the following discussion, particularly when taken together with the accompanying drawings.

DETAILED DESCRIPTION

An aspect of the invention is a method to coat a SiC ignitor with a silicon dioxide coating. The SiC ignitor can be formed by any method known in the art. One method of forming the SiC ignitor, described in U.S. Pat. Nos. 3,875,477 and 6,297,183, both of which are incorporated by reference in their entirety, involves forming an ignitor shaped green body comprising fine and coarse SiC particles and firing the green body. During the firing step, the reactive fine SiC particles vaporize and redeposit on the coarse SiC particles thereby forming a layer of crystallized SiC particles that coat and connect the coarse SiC particles. The extent of crystallization of the sintered body can vary. If the fired body is not fully recrystallized, some of the unreactive fine SiC particles remain in the inner pores of the body. In embodiments, it is desirable for the sintered body to be fully crystallized, such that less than 5%, preferably less than 1%, or more preferably essentially none, the fine SiC particles can be detected by image analysis.

The method of coating the SiC ignitor includes applying a silicon dioxide material to at least a portion of the SiC ignitor and drying the silicon dioxide material. In some embodiments, the method of coating the SiC ignitor provides a $SiO_2$ layer that is substantially continuous and/or substantially free of one or more of perforations, voids, cavities, cracks, and other defects that would expose the underlying SiC material. In some embodiments, the method of coating the SiC ignitor provides a $SiO_2$ layer that is substantially uniform. In some embodiments, the $SiO_2$ layer has a thickness that varies between about 0% to about 20%, in some embodiment the thickness varies by no more than 20%, by no more than 18%, by no more than 16%, by no more than 14%, by no more than 12%, by no more than 10%, by no more than 8%, by no more than 6%, by no more than 4%, by no more than 2%, or by about 0%, or by a range within any of two values set forth herein. In other embodiments, the thickness of the $SiO_2$ layer, need not be consistent over the entire SiC material as the thickness of the $SiO_2$ can depend on the outer surface of the underlying SiC layer. Thus, one skilled in the art should understand that the thickness as discussed herein can be a nominal thickness, or an average thickness of the $SiO_2$ coating, and that the $SiO_2$ coating need not be uniform to have a positive impact on the SiC aging process. The thickness of the $SiO_2$ coating can be between about 0.1 µm and about 5 µm, in some embodiments about 0.1 µm, about 0.2 µm, about 0.3 µm, about 0.4 µm, about 0.5 µm, about 0.6 µm, about 0.7 µm, about 0.8 µm, about 0.9 µm, about 1.0 µm, about 1.2 µm, about 1.4 µm, about 1.6 µm, about 1.8 µm, about 2 µm, about 2.2 µm, about 2.4 µm, about 2.6 µm, about 2.8 µm, about 3.0 µm, about 3.2 µm, about 3.4 µm, about 3.6 µm, about 3.8 µm, about 4 µm, about 4.2 µm, about 4.4 µm, about 4.6 µm, about 4.8 µm, or about 5 µm, or at a range within any of two values set forth herein. In these embodiments, the $SiO_2$ coating is not formed from the oxidation of SiC, but rather $SiO_2$ is directly coated onto the SiC material. In some embodiments, the thickness of the SiC is not reduced in thickness when the SiC is coated with silicon dioxide. In some embodiments, the SiC is not chemically altered or changed by the addition of the silicon dioxide coating.

In some embodiments, at least one electrical property of the SiC ignitor coated with a silicon dioxide coating can be equal to or within 20% of the corresponding electrical property of a sample that is not coated with the silicon dioxide, prior to operation. In some embodiments, the at least one electrical property of a SiC ignitor coated with a silicon dioxide coating can be within about 0.5%, about 1%, about 1.5%, about 2%, about 2.5%, about 3%, about 3.5%, about 4%, about 4.5%, about 5%, about 10%, about 15%, or about 20%, or at a range within any of two values set forth herein, of the corresponding electrical property of a sample that is not coated with the silicon dioxide, prior to operation. The electrical property can be the resistance of the sample, which, in some embodiments, can measured at room temperature or at operating temperature(s).

In some embodiments, the silicon dioxide coating may comprise one or more layers of silicon dioxide. In some embodiments, at least one additional layer of the silicon dioxide material can be applied to a previously applied silicon dioxide layer. The total thickness of all of the layers of the silicon dioxide applied to the SiC can be between about 0.1 µm and about 5 µm. In some embodiments, silicon dioxide can have a thickness of about 0.1 µm, about 0.2 µm, about 0.3 µm, about 0.4 µm, about 0.5 µm, about 0.6 µm, about 0.7 µm, about 0.8 µm, about 0.9 µm, about 1 µm, about 1.1 µm, about 1.2 µm, about 1.3 µm, about 1.4 µm, about 1.5 µm, about 1.6 µm, about 1.7 µm, about 1.8 µm, about 1.9 µm, about 2 µm, about 2.1 µm, about 2.2 µm, about 2.3 µm, about 2.4 µm, about 2.5 µm, about 2.6 µm, about 2.7 µm, about 2.8 µm, about 2.9 µm, about 3.0 µm, about 3.1 µm, about 3.2 µm, about 3.3 µm, about 3.4 µm, about 3.5 µm, about 3.6 µm, about 3.7 µm, about 3.8 µm, about 3.9 µm, about 4 µm, about 4.1 µm, about 4.2 µm, about 4.3 µm, about 4.4 µm, about 4.5 µm, about 4.6 µm, about 4.7 µm, about 4.8 µm, about 4.9 µm, or about 5.0 µm, or at a range within any of two values set forth herein. When included, up to about 3 additional layers can be applied to the initially applied layer of silicon dioxide, to result in a total thickness of between about 0.1 µm and about 5 µm.

The silicon dioxide can be applied to between about 25% and about 100% of the surface area of the SiC material of the ignitor, preferably between about 50% and about 100% of the surface area of the SiC material of the ignitor. In some embodiments, silicon dioxide can be applied to about 25%, about 30%, about 40%, about 45%, about 50%, about 55%, about 60%, about 65%, about 70%, about 75%, about 80%, about 85%, about 90%, about 95%, or about 100%, or at a range within any of two values set forth herein, of the surface area of the SiC material of the ignitor. The silicon dioxide can adhere to the SiC of the ignitor. In some embodiments, the SiC can be untreated prior to application of the silicon dioxide, while in other embodiments, the SiC can be pretreated. The pretreatment can be cleaning the SiC or increasing the surface area of at least a portion of the SiC, which can be performed by abrading the SiC. A combination of pretreatments can be used. In some embodiments, the SiC can be coated with one or more additional coatings other than the silicon dioxide coating. The additional coating may be disposed between the SiC material and the one or more silicon dioxide layers. In some embodiments, the SiC can be coated with a second recrystallized layer of SiC (referred to as an ARC coating), such as that described in U.S. Pat. No. 6,297,183, and then further coated with one or more silicon dioxide layers. In other embodiments, the SiC is not coated with an additional coating.

Figure 1:
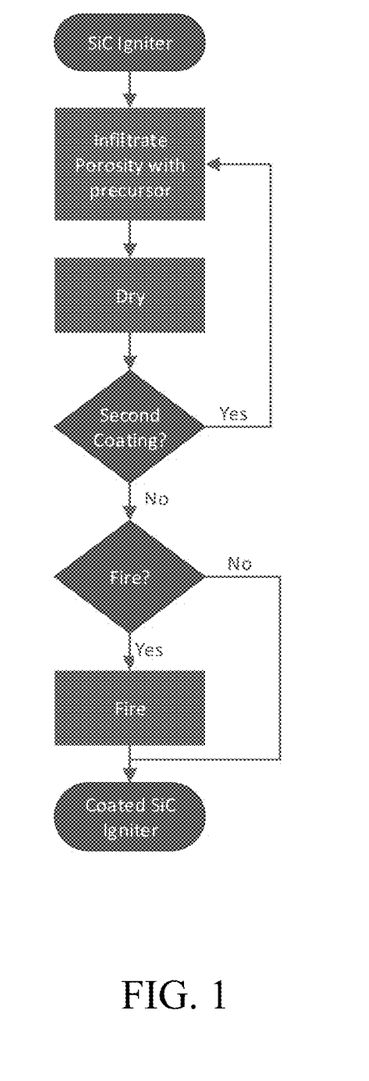
FIG. 1 illustrates a process chart of an embodiment of the present invention.

While a precursor can be used to form the silicon dioxide, the precursor is not the SiC of the ignitor. Nor is the surface of the SiC oxidized to form the silicon dioxide. Rather, the silicon dioxide can be applied to the SiC ignitor by dipping, painting, spraying, capillary infiltration, or a combination of these application methods. The application temperature of the silicon dioxide can be between about 15° C. and about 70° C., and in some embodiments ambient room temperature (15-30° C.). In some embodiments, the application temperature can be about 15° C., about 20° C., about 25° C., about 30° C., about 35° C., about 40° C., about 45° C., about 50° C., about 55° C., about 60° C., about 65° C., or about 70° C., or at a range within any of two values set forth herein. When the silicon dioxide is applied by dipping, the SiC ignitor can be dipped into the silicon dioxide material for between about 10 seconds and about 5 minutes. In some embodiments, the SiC ignitor can be dipped into the silicon dioxide material for about 10 seconds, 15 seconds, 20 seconds, 25 seconds, 30 seconds, 35 seconds, 40 seconds, 45 seconds, 50 seconds, 55 seconds, 1 minute, 1.5 minutes, 2 minutes, 2.5 minutes, 3 minutes, 3.5 minutes, 4 minutes, 4.5 minutes, or 5 minutes, or at a range within any of two values set forth herein. If voids are present in the silicon dioxide coating, then the silicon dioxide can be applied specifically to the voided areas to provide additional coverage to the SiC ignitor. Furthermore, the SiC ignitor can be dipped over additional cycles to develop a thicker layer of the silicon dioxide. Thus, a dipping cycle can be repeated to result in a final silicon dioxide coating thickness of between 0.1 µm and 5 µm. FIG. 1 illustrates an embodiment of the method of the invention utilizing a precursor to form the silicon dioxide layer.

The silicon dioxide can be provided as a sol, a gel, a solution comprising silicon dioxide, a silicon containing organometallic, prehydrolized ethyl silicate (R-25) (supplied by REMET Corp.), REMASOL® PD-10 (SP-30) (supplied by REMET Corp., an aqueous colloidal dispersion of silica particles that are non-crystalline, high specific surface area and are negatively charged particles which have been stabilized with sodium hydroxide), or a combination thereof. Solvents suitable for use in the solution include, but are not limited to, water, alcohol (for example, ethanol, isopropanol, or methanol), and other solvents which can be determined based on compatibility with the silicon dioxide material and combinations thereof. In some embodiments, the silicon dioxide can first be provided as a precursor to form the silicon dioxide, which is then used with the invention. Suitable precursors include tetraethyl orthosilicate or other alkoxides of silicon. These precursors can then be converted to silicon oxide using methods known in the art (e.g., addition of water, or oxidation of the precursor). Advantageously, in some embodiments, since the $SiO_2$ can be a liquid, gel or sol during application, the resulting $SiO_2$ coating is more continuous after evaporation compared to infiltrating SiC pores with SiC particles.

After the silicon dioxide material (e.g., sol or precursor solution, etc.) is applied to the SiC, it is dried. The drying temperature can be between about 15° C. and about 200° C. In some embodiments, the application temperature can be about 15° C., about 20° C., about 25° C., about 30° C., about 35° C., about 40° C., about 45° C., about 50° C., about 55° C., about 60° C., about 65° C., or about 70° C., about 75° C., about 80° C., about 85° C., about 90° C., about 95° C., about 100° C., about 105° C., about 110° C., about 115° C., about 120° C., about 125° C., about 130° C., about 135° C., about 140° C., about 145° C., about 150° C., about 155° C., about 160° C., about 165° C., about 170° C., about 175° C., about 180° C., about 185° C., about 190° C., about 195° C., or about 200° C., or at a range within any of two values set forth herein, for between about 10 minutes and about 24 hours, in some embodiments about 10 minutes, about 30 minutes, about 45 minutes, about 1 hour, about 1.5 hours, about 2 hours, about 2.5 hours, about 3 hours, about 3.5 hours, about 4 hours, about 4.5 hours, about 6 hours, about 6.5 hours, about 7 hours, about 8 hours, about 9 hours, about 10 hours, about 11 hours, about 12 hours, about 13 hours, about 14 hours, about 15 hours, about 16 hours, about 17 hours, about 18 hours, about 19 hours, about 20 hours, about 21 hours, about 22 hours, about 23 hours, or about 24 hours, or at a range within any of two values set forth herein. Following the initial drying step, the coated ignitors can be heated to an elevated temperature between about 500° C. and about 1,400° C., in some embodiments about 1,000° C. The elevated temperature can be about 500° C., about 550° C., about 600° C., about 650° C., about 700° C., about 750° C., about 800° C., about 850° C., about 900° C., about 950° C., about 1,000° C., about 1,050° C., about 1,100° C., about 1,150° C., about 1,200° C., about 1,250° C., about 1,300° C., about 1,350° C., or about 1,400° C., or at a range within any of two values set forth herein. The parts can be subjected to the elevated temperature for at least 15 seconds, in some embodiments between about 15 seconds and about 2 hours, in some embodiments about 30 minutes. The time period can be about 15 seconds, about 20 seconds, about 25 seconds, about 30 seconds, about 35 seconds, about 40 seconds, about 45 seconds, about 50 seconds, about 55 seconds, about 1 minute, about 30 minutes, about 1 hours, about 1.5 hours, or about 2 hours, or at a range within any of two values set forth herein. In some embodiments, the ignitor can be tested before it is sold. The testing includes subjecting the ignitor to an elevated temperature between about 1,000° C. and about 1,500° C., for between about 15 seconds and about 30 seconds. In some embodiments, the testing temperature can be about 1,000° C., about 1,050° C., about 1,100° C., about 1,150° C., about 1,200° C., about 1,250° C., about 1,300° C., about 1,350° C., about 1,400° C., about 1,450° C., or about 1,500° C. In some embodiments, the time period at the elevated temperature can be about 15 seconds, about 20 seconds, about 25 seconds, or about 30 seconds, or at a range within any of the two values set forth herein. In some embodiments, this testing condition can be used as the drying or thermal processing step of the present invention.

An aspect of the invention is a SiC ignitor. The ignitor includes a silicon dioxide coating on at least a portion of a SiC material of an ignitor. The thickness of the silicon dioxide coating is between about 0.1 µm and about 5 µm. In some embodiments, silicon dioxide can have a thickness of about 0.1 µm, about 0.2 µm, about 0.3 µm, about 0.4 µm, about 0.5 µm, about 0.6 µm, about 0.7 µm, about 0.8 µm, about 0.9 µm, about 1 µm, about 1.1 µm, about 1.2 µm, about 1.3 µm, about 1.4 µm, about 1.5 µm, about 1.6 µm, about 1.7 µm, about 1.8 µm, about 1.9 µm, about 2 µm, about 2.1 µm, about 2.2 µm, about 2.3 µm, about 2.4 µm, about 2.5 µm, about 2.6 µm, about 2.7 µm, about 2.8 µm, about 2.9 µm, about 3.0 µm, about 3.1 µm, about 3.2 µm, about 3.3 µm, about 3.4 µm, about 3.5 µm, about 3.6 µm, about 3.7 µm, about 3.8 µm, about 3.9 µm, about 4 µm, about 4.1 µm, about 4.2 µm, about 4.3 µm, about 4.4 µm, about 4.5 µm, about 4.6 µm, about 4.7 µm, about 4.8 µm, about 4.9 µm, or about 5.0 µm, or at a range within any of two values set forth herein. In some embodiments, the Sift layer that is provided on at least a portion of the SiC ignitor is substantially continuous and/or substantially free of one or more of perforations, voids, cavities, cracks, and other defects that would expose the underlying SiC material. In some embodiments, the $SiO_2$ layer that is provided on at least a portion of the SiC ignitor is substantially uniform. In some embodiments, the $SiO_2$ layer has a thickness that varies by about 0% to about 20%, in some embodiment the thickness varies by no more than 20%, by no more than 18%, by no more than 16%, by no more than 14%, by no more than 12%, by no more than 10%, by no more than 8%, by no more than 6%, by no more than 4%, by no more than 2%, or by about 0%, or by a range within any of two values set forth herein.

The ignitors of the present invention, that are coated with silicon dioxide, can increase the life (i.e., the operational duration) of the ignitor by between about 2% and 100%, in some embodiments the life of the ignitor is increased by about 2%, about 10%, about 20%, about 30%, about 40%, about 50%, about 60%, about 70%, about 80%, about 90%, or about 100%, or at a range within any of two values set forth herein, when compared to an ignitor that is not coated with the silicon dioxide coating of the present invention. In some embodiments, the ignitor can be used for between about 6,000 uses and about 13,000 uses before failure, in some embodiments at least about 6,000 uses, at least about 6,500 uses, at least about 7,000 uses, at least about 7,500 uses, at least about 8,000 uses, at least about 8,500 uses, at least about 9,000 uses, at least about 9,500 uses, at least about 10,000 uses, at least about 10,500 uses, at least about 11,000 uses, at least about 11,500 uses, at least about 12,000 uses, at least about 12,500 uses, or at least about 13,000 uses, or at a range within any of two values set forth herein, before failure.

Notably, the silicon dioxide of the present invention is not a sacrificial layer, meaning that it is not removed prior to use. Furthermore, the silicon dioxide can penetrate between about 25% and about 100% of the pores of the SiC. The silicon dioxide can be provided to at least about 25% of a surface area of the SiC. In some embodiments, the silicon dioxide can be provided to between about 25% and about 100% of the surface area of the SiC. In some embodiments, the silicon dioxide can be provided to about 25%, about 30%, about 35%, about 40%, about 45%, about 50%, about 55%, about 60%, about 65%, about 70%, about 75%, about 80%, about 85%, about 90%, about 95%, about 99%, or about 100%, or at a range within any of two values set forth herein, of the surface area of the SiC.

The silicon dioxide can include impurities. The silicon dioxide can include between about 0 wt. % and about 2 wt. % of impurities, which can be NaOH or other additives that promote solution stability. In some embodiments, the weight percentage of the impurities in the silicon dioxide can be about 0 wt. %, about 0.25 wt. %, about 0.5 wt. %, about 0.75 wt. %, about 1 wt. %, about 1.25 wt. %, about 1.5 wt. %, about 1.75 wt. %, or about 2 wt. %, or at a range within any of two values set forth herein. The balance of the silicon dioxide can comprise silicon dioxide in the form of $SiO_2$. In some embodiments, the silicon dioxide can first be provided as a precursor to form the silicon dioxide, which is then used to form the coating of the invention. Suitable precursors include ethyl silicate, prehydrolized ethyl silicate, tetraethyl orthosilicate, or other alkoxide of silicon. Suitable precursors do not include SiC. In some embodiments, the composition of the silicon dioxide coating can comprise between about 5 wt. % and about 50 wt. % of the silicon dioxide precursor. In some embodiments, the composition of silicon dioxide coating can comprise about 5 wt. %, about 10 wt. %, about 15 wt. %, about 20 wt. %, about 25 wt. %, about 30 wt. %, about 35 wt. %, about 40 wt. %, about 45 wt. %, or about 50 wt. %, or at a range within any of two values set forth herein, of the silicon dioxide precursor.

An aspect of the invention is a kit, which includes a SiC ignitor of the present invention described herein. The SiC ignitor includes a SiC material, and at least one layer of a silicon dioxide material. The thickness of the silicon dioxide material is between about 0.1 μm and about 5 μm and the silicon dioxide covers between about 25% and about 100% of a surface area of the SiC material of the SiC ignitor.

Another aspect of the invention is a method of using a SiC ignitor of the present invention described herein. The method includes providing a SiC ignitor that includes a SiC material and at least one layer of a silicon dioxide material, wherein the thickness of the silicon dioxide material is between about 0.1 μm and about 5 μm and the silicon dioxide covers between about 25% and about 100% of a surface area of the SiC material of the SiC ignitor; and applying a voltage sufficient to achieve or maintain a temperature on a surface of the SiC ignitor to ignite a gas (in some embodiments, greater than or equal to about 1000° C.).

As will be understood by one skilled in the art, the $SiO_2$ coating disclosed herein, does not prevent the oxidation of the underlying SiC material, rather the $SiO_2$ coating substantially slows the rate of oxidation of the underlying SiC material, thereby also slowing the rate of change (i.e., increase) in the resistance of the ignitor. In some embodiments, a SiC ignitor that is coated with the silicon dioxide coating of the present invention, can be used for a duration that is between about 2% and about 100% longer than a duration of an ignitor that is not coated with the silicon dioxide coating of the present invention, in some embodiments for a duration that is about 2%, about 10%, about 20%, about 30%, about 40%, about 50%, about 60%, about 70%, about 80%, about 90%, or about 100%, or at a range within any of two values set forth herein, longer when compared to a duration of an ignitor that is not coated with the silicon dioxide coating of the present invention.

EXAMPLES

Example 1

Three SiC ignitors were provided and tested to determine the effect of the silicon dioxide coating on the life of the ignitor. One ignitor was not coated, the second was coated with SP-30, and the third was coated with tetraethyl orthosilicate (R-25). Both silicon dioxide coatings were supplied by REMET Corp, Utica. N.Y. The silicon dioxides were both in liquid form and applied using a dipping method, where the ignitors were dipped into their respective silicon dioxide liquids for between about 10 seconds and about 60 seconds. Thereafter, the coated samples were dried at 95° C. for 1 hour then fired to 1,000° C. in air for a period of about 30 minutes. These three samples were life tested. Life testing of the ignitors was performed by powering the ignitor "on" for five and a half minutes and then switching them "off" for one minute. During the first thirty seconds of the on-cycle, no gas flame was present; during the remaining five minutes of the on-cycle, a natural gas flame was present on the hot zone surface of the ignitor. The test data showed the untreated ignitors aged the fastest, then R-25 coated ignitors, and finally the SP30 coated ignitors.

Example 2

Figure 2:
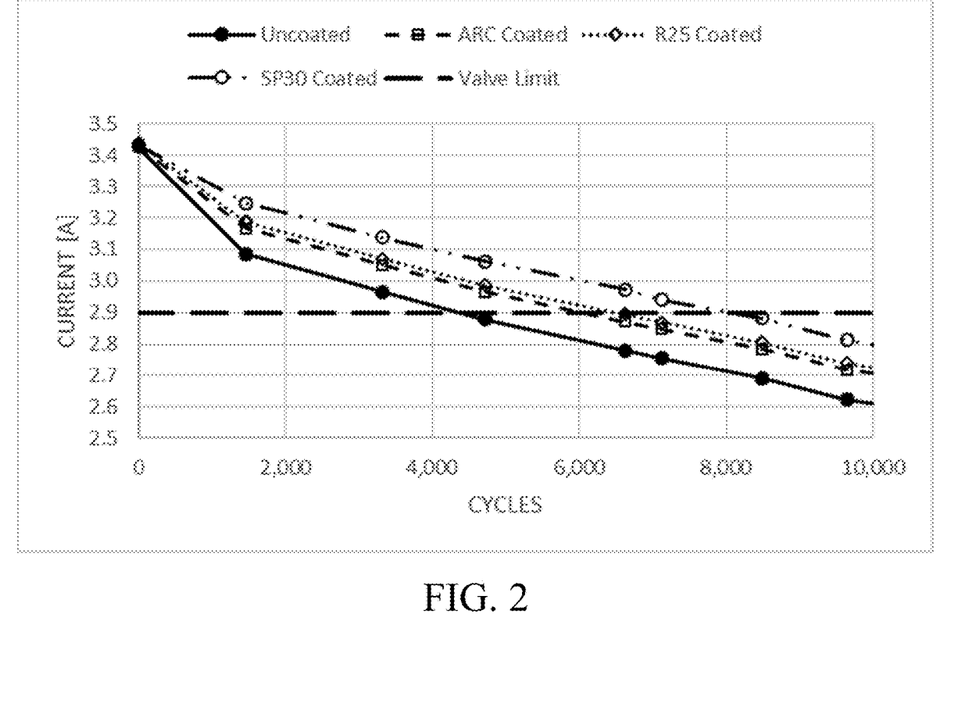
FIG. 2 illustrates experimental test data comparing ignitors coated with a silicon dioxide layer of the present invention (SP-30 and R-25 coatings), with an uncoated sample or a sample utilizing a second recrystallized layer of SiC (i.e., an ARC coating)

A set of confirmation samples were made using a second lot of SP-30 material. These samples were also testing for aging (i.e., life tested) and were found to be about 50% better compared to the standard uncoated samples. FIG. 2 illustrates aging tests for samples coated with SP-30 (silicon dioxide), R-25 (silicon dioxide), a traditional ARC coating, or an uncoated sample. Both the R-25 and the S-30 samples provide longer use compared to the uncoated sample, but the S-30 coated sample showed an about 33% increase in the number of cycles over the ARC sample, and almost a 50% increase in the number of cycles when compared to the uncoated sample.

Example 3

Figure 3:
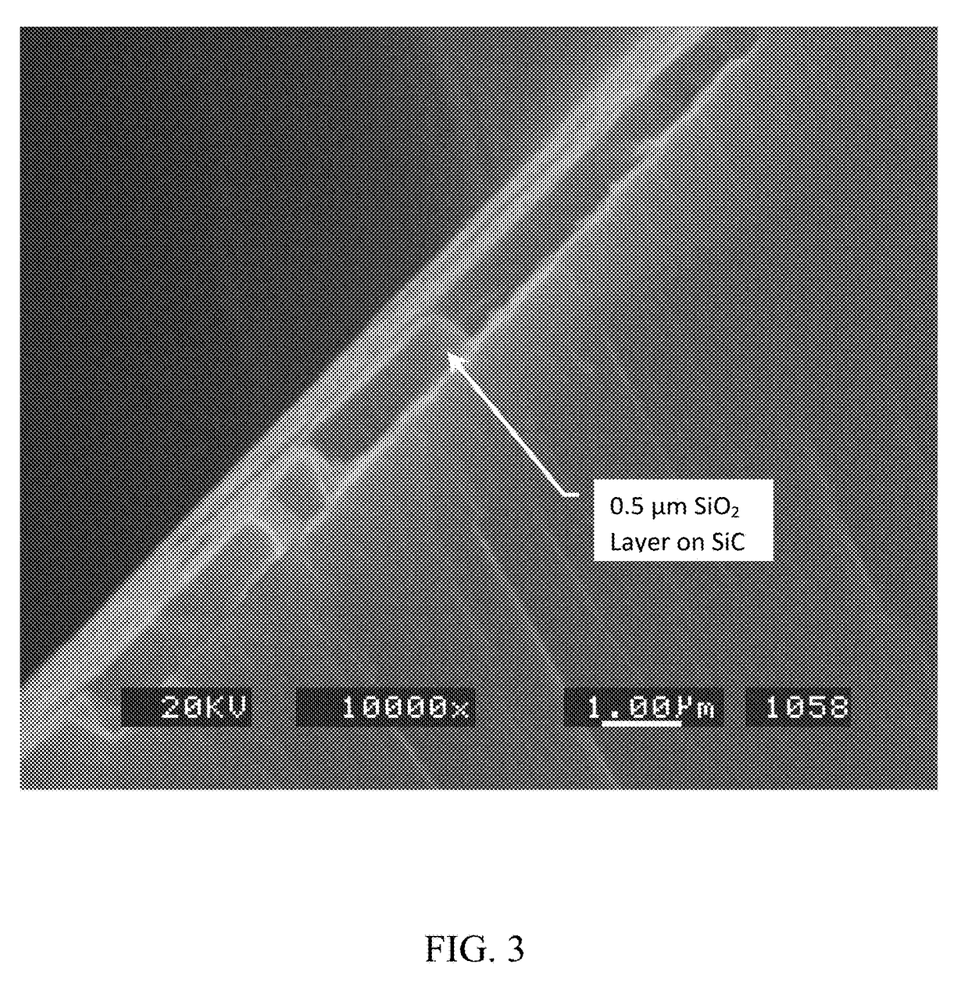
FIG. 3 illustrates a scanning electron microscope (SEM) image of an ignitor with two layers of an SP-30 coating.

SEM examination of an ignitor with a 2× (i.e., two layers) SP-30 coating showed that coating had a nominal thickness on the order of 0.5 to 1 μm (see FIG. 3). The majority of the surface of the SiC appears to have this coating adhered to the surface. By extension the 1× (i.e., one layer) coating would have a thickness in the 0.25 to 0.5 μm range.

Example 4

Figure 4:
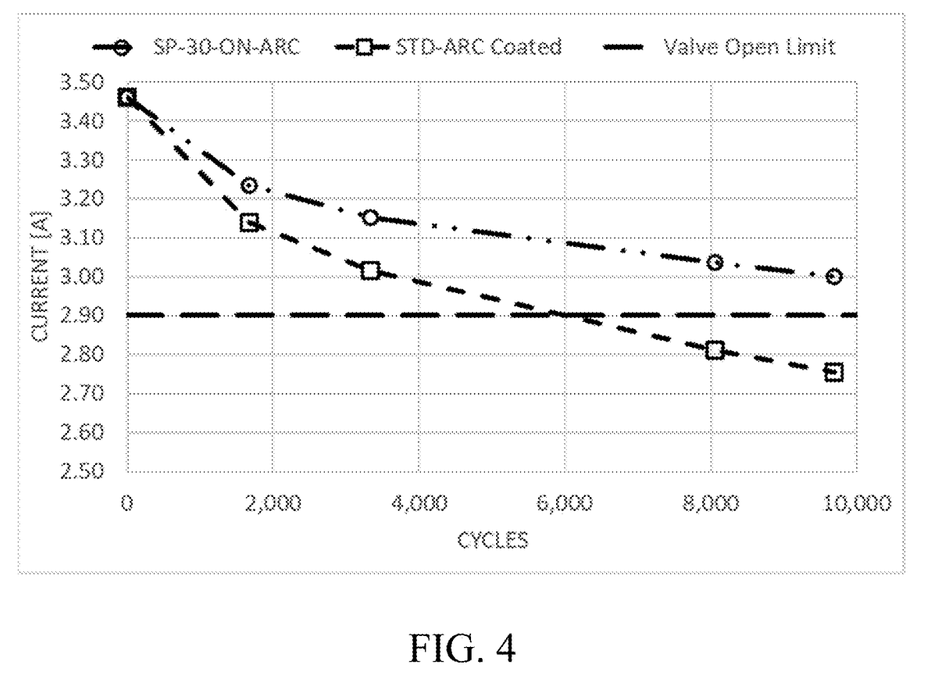
FIG. 4 illustrates experimental test data for an ignitor coated with a second recrystallized layer of SiC (i.e., an ARC coating) and an ignitor coated with an ARC coating and further coated with two layers of an SP-30 coating.

A set of traditional ARC coated SiC ignitors were prepared, and a portion of these ignitors were further coated with a 2× coating of the SP-30 using a drip-dry method. FIG. 4 illustrates the aging results of the two sets of samples, the ARC coated and the ARC-$SiO_2$ coated. The ARC-$SiO_2$ coated samples aged significantly slower, having approximately a 50% increase in the number of use cycles when compared to the uncoated sample.

Ranges have been discussed and used within the forgoing description. One skilled in the art would understand that any sub-range within the stated range would be suitable, as would be any number within the broad range, without deviating from the invention.

The foregoing description of the present invention, related to silicon dioxide coatings on a SiC material of an ignitor, has been presented for purposes of illustration and description. The description is not intended to limit the invention to the form disclosed herein. Consequently, variations and modifications commensurate with the above teachings, and the skill or knowledge of the relevant art, are within the scope of the present invention. The embodiment described hereinabove is further intended to explain the best mode known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A method to apply a silicon dioxide coating to a silicon carbide ignitor, comprising:
   coating at least a portion of a silicon carbide material of the silicon carbide ignitor with a silicon dioxide material to produce a silicon carbide ignitor coated with a first layer of the silicon dioxide, wherein the silicon dioxide material is not produced by oxidizing the silicon carbide material of the silicon carbide ignitor; and
   drying the first layer of the silicon dioxide material to form a silicon dioxide layer.

2. The method of claim 1, further comprising applying at least one additional coating of silicon dioxide material to the first layer of the silicon dioxide of the silicon carbide ignitor to produce a silicon carbide ignitor comprising at least two layers of silicon dioxide material, wherein a total thickness of the at least two layers of the silicon dioxide material is between about 0.1 μm and about 5 μm.

3. The method of claim 1, wherein the coating comprises dipping the silicon carbide ignitor in a solution comprising the silicon dioxide material for between about 10 seconds and about 60 seconds.

4. The method of claim 1, further comprising applying the silicon dioxide material to at least one void in the silicon dioxide layer.

5. The method of claim 1, wherein the silicon dioxide layer is adhered to the silicon carbide material of the silicon carbide ignitor.

6. The method of claim 1, wherein the at least a portion of the silicon dioxide layer covers between about 25% and about 100% of a surface area of the silicon carbide material of the silicon carbide ignitor.

7. The method of claim 1, wherein the drying occurs at a temperature between about 50° C. and about 130° C. for between about 5 and about 60 minutes.

8. The method of claim 1, wherein the drying does not occur in a nitrogen environment.

9. The method of claim 1, wherein the drying does not occur in an oxygen rich environment, wherein a concentration of the oxygen is greater than the oxygen concentration in air.

10. The method of claim 1, wherein the silicon carbide material comprises a second recrystallized SiC coating.

11. The method of claim 1, wherein the silicon dioxide material comprises at least one of a silicon dioxide sol, a solution comprising a solvent and the silicon dioxide material, or a solution comprising a silicon dioxide precursor.

12. An ignitor, comprising:
a silicon dioxide coating applied to at least a portion of a silicon carbide material of a silicon carbide containing ignitor, wherein a thickness of the silicon dioxide coating is between about 0.1 μm and about 5 μm, and wherein the silicon dioxide coating is not formed from the silicon carbide material.

13. The ignitor of claim 12, wherein the silicon dioxide coating is not a sacrificial layer.

14. The ignitor of claim 12, wherein the ignitor further comprises a second recrystallized SiC coating.

15. The ignitor of claim 12, wherein silicon dioxide coating is substantially continuous and the thickness of the silicon dioxide coating varies by no more than about 20%.

16. The ignitor of claim 12, wherein the ignitor consists of the silicon carbide coated with the silicon dioxide.

17. The ignitor of claim 12, wherein a lifetime of the ignitor is at least about 10% longer than a lifetime of an ignitor that is not coated with the silicon dioxide coating.

18. The ignitor of claim 12, wherein the silicon dioxide coating covers between about 25% and about 100% of the silicon carbide material.

19. The ignitor of claim 12, wherein the silicon carbide material is substantially free of fine SiC particles.

20. A kit, comprising:
a silicon carbide ignitor comprising:
a silicon carbide material; and
at least one layer of a silicon dioxide material,
wherein a thickness of the silicon dioxide material is between about 0.1 and about 5 μm,
wherein the silicon dioxide covers between about 25% and about 100% of a surface area of the silicon carbide material of the silicon carbide ignitor,
and wherein the silicon dioxide coating is not formed from the silicon carbide material.

* * * * *